United States Patent
Sauvageot et al.

(10) Patent No.: US 12,534,633 B2
(45) Date of Patent: Jan. 27, 2026

(54) INKJET INK FOR PRINTED CIRCUIT BOARDS

(71) Applicant: AGFA-Gevaert NV, Mortsel (BE)

(72) Inventors: Marion Sauvageot, Mortsel (BE); Johan Loccufier, Mortsel (BE)

(73) Assignee: Agfa-Gevaert NV, Mortsel (BE)

(*) Notice: Subject to any disclaimer, the term of this patent is extended or adjusted under 35 U.S.C. 154(b) by 551 days.

(21) Appl. No.: 17/927,459

(22) PCT Filed: May 17, 2021

(86) PCT No.: PCT/EP2021/062969
§ 371 (c)(1),
(2) Date: Nov. 23, 2022

(87) PCT Pub. No.: WO2021/239488
PCT Pub. Date: Dec. 2, 2021

(65) Prior Publication Data
US 2023/0174805 A1  Jun. 8, 2023

(30) Foreign Application Priority Data

May 27, 2020 (EP) ..................................... 20176718

(51) Int. Cl.
| | |
|---|---|
| C09D 11/326 | (2014.01) |
| C09D 11/037 | (2014.01) |
| C09D 11/101 | (2014.01) |
| C09D 11/107 | (2014.01) |
| H05K 3/34 | (2006.01) |

(52) U.S. Cl.
CPC .......... *C09D 11/326* (2013.01); *C09D 11/037* (2013.01); *C09D 11/101* (2013.01); *C09D 11/107* (2013.01); *H05K 3/3452* (2013.01)

(58) Field of Classification Search
CPC .................................................. C09D 11/326
USPC ........................................ 347/100; 106/31.13
See application file for complete search history.

(56) References Cited

U.S. PATENT DOCUMENTS

| | | | |
|---|---|---|---|
| 2005/0049325 A1 | 3/2005 | Chisholm et al. | |
| 2008/0188612 A1* | 8/2008 | Louwet ................ | C09D 11/326 524/556 |
| 2012/0328553 A1* | 12/2012 | Jin ......................... | A61K 6/887 424/78.02 |
| 2017/0143594 A1* | 5/2017 | Lu ............................ | A61K 6/69 |
| 2020/0157313 A1* | 5/2020 | Jin ............................ | C08F 4/00 |

FOREIGN PATENT DOCUMENTS

| | | | |
|---|---|---|---|
| EP | 1992669 A1 | 11/2008 | |
| EP | 3018137 A1 | 5/2016 | |
| EP | 3321330 A1 | 5/2018 | |
| EP | 3533844 A | 9/2019 | |
| JP | 2001-066770 A | 3/2001 | |
| JP | 2005-133071 A | 5/2005 | |
| JP | 2009-167346 A | 7/2009 | |
| JP | 2017-517136 A | 6/2017 | |
| JP | 2020-512412 A | 4/2020 | |
| JP | 2021-066770 A | 4/2021 | |
| JP | 2021-515093 A | 6/2021 | |
| KR | 100684884 B1 | 2/2007 | |
| WO | WO-2007060265 A2 * | 5/2007 | ............. C09B 48/00 |
| WO | WO 2014/111942 A1 | 7/2014 | |
| WO | WO 2015/132020 A1 | 9/2015 | |
| WO | WO-2018087055 A1 * | 5/2018 | .......... B41M 5/0047 |
| WO | WO 2019/220288 A1 | 11/2019 | |

OTHER PUBLICATIONS

European Patent Office, International Search Report in International Patent Application No. PCT/EP2021/062969, mailed Jul. 19, 2021, 4 pp.
European Patent Office, Written Opinion in International Patent Application No. PCT/EP2021/062969, mailed Jul. 19, 2021, 5 pp.

* cited by examiner

*Primary Examiner* — Laura Martin
(74) *Attorney, Agent, or Firm* — Leydig, Voit & Mayer, Ltd.

(57) ABSTRACT

A radiation curable composition comprising at least one polymerizable compound and an adhesion promoter, characterized in that the adhesion promoter includes: —a polymerizable group selected from the group consisting of an acrylate, a methacrylate, an acrylamide, a methacrylamide, a styrene, a maleimide, a vinyl ether and a vinyl ester; and—an adhesion promoting group containing at least one nitrogen containing five or six membered heteroaromatic ring.

17 Claims, No Drawings

INKJET INK FOR PRINTED CIRCUIT BOARDS

CROSS-REFERENCE TO RELATED APPLICATIONS

This patent application is the U.S. national phase of copending International Patent Application No. PCT/EP2021/062969, filed May 17, 2021, which claims the benefit of European Patent Application No. 20176718.3, filed May 27, 2020.

TECHNICAL FIELD OF THE INVENTION

The present invention relates to a radiation curable inkjet ink for use in a method of manufacturing Printed Circuit Boards.

BACKGROUND ART FOR THE INVENTION

The production workflow of printed circuit boards (PCBs) is gradually shifting from the standard workflow towards a digital workflow to reduce the amount of process steps and lowering the cost and the environmental impact, especially for short run productions.

Inkjet printing is a preferred digital manufacturing technology for different steps of the PCB manufacturing process, going from etch resist over solder mask to legend printing. Preferred inkjet inks are UV curable ink jet inks.

In the different production steps of PCBs, adhesion of the inkjet inks towards various substrates is of crucial importance. When the radiation curable inkjet ink is used to produce a solder mask, the adhesion of the cured inkjet ink on several substrates has to survive the severe conditions used during soldering (solder resistance) and ENIG plating (ENIG plating resistance). Especially the ENIG plating process wherein severe and varying conditions (pH and temperature) are used is very demanding as regard to the adhesion requirements of the inkjet ink.

As more and more mobile devices are used, there is an increasing demand for flexible PCBs. Such Flexible PCBs typically have thinner copper circuitry. A solder mask has to adhere well to the copper circuitry and conventionally, in rigid PCBs, a pretreatment of the copper, such as microetching, is carried out to improve the adhesion between the circuitry and the solder mask. However, all these pretreatments remove copper and therefore result in thinner copper circuitry. As the copper circuitry of flexible PBCs are thinner, such pretreatments are not desirable, as they would result in a copper circuitry that is too thin.

The provision of a primer or a surface treatment solution has been proposed as an alternative approach to improve the adhesion between the copper circuitry and the solder mask. EP-A 3018137 (Shikoku Chemicals Corp.) discloses a surface treatment solution including an azole silane compound. WO2014/111942 (Camtek) disclose a surface treatment with an intermediate layer, preferably a monolayer, of molecules including a polar group that physically attaches to a substrate, for example copper, and a group that optimizes the surface energy towards a formulation to be printed on the substrate.

However, the provision of such primers or surface treatment solutions requires additional process steps, complicating the manufacturing process and increasing the production cost and its ecological impact.

Therefore, there is a need for radiation curable solder mask inkjet inks having excellent adhesion on untreated copper under the severe conditions used during soldering and ENIG plating.

SUMMARY OF THE INVENTION

It is an object of the invention to provide a radiation curable inkjet ink for use in a method of manufacturing a flexible printed circuit board (PCB) including an inkjet printing step wherewith a solder mask having an improved solder and ENIG resistance is realized.

The object of the invention is realized by radiation curable inkjet ink as defined in claim 1.

Further objects of the invention will become apparent from the description hereinafter.

DETAILED DESCRIPTION OF THE INVENTION

Definitions

The term "monofunctional" in e.g. monofunctional polymerizable compound means that the polymerizable compound includes one polymerizable group.

The term "difunctional" in e.g. difunctional polymerizable compound means that the polymerizable compound includes two polymerizable groups.

The term "polyfunctional" in e.g. polyfunctional polymerizable compound means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted alkaryl group is preferably a phenyl or naphthyl group including one, two, three or more $C_1$ to $C_6$-alkyl groups.

Unless otherwise specified a substituted or unsubstituted aralkyl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —NO$_2$.

Radiation Curable Composition

The radiation curable composition according to the present invention comprises at least one polymerizable compound and an adhesion promoter as described below.

The radiation curable composition may further comprise other ingredients such as a photoinitiator, an adhesion promoter, a colorant, a polymeric dispersant, a polymerization inhibitor, a flame retardant or a surfactant.

The radiation curable composition is preferably a radiation curable inkjet ink.

The radiation curable inkjet ink may be cured with any type of radiation but is preferably cured with UV radiation, more preferably with UV radiation from UV LEDs. The radiation curable inkjet ink is thus preferably a UV curable inkjet ink.

For reliable industrial inkjet printing, the viscosity of the radiation curable inkjet ink is preferably no more than 20 mPa·s at 45° C., more preferably between 1 and 18 mPa·s at 45° C., and most preferably between 4 and 14 mPa·s at 45° C., all at a shear rate of 1000 s$^{-1}$.

A preferred jetting temperature is between 10 and 70° C., more preferably between 20 and 55° C., and most preferably between 25 and 50° C.

For good image quality and adhesion, the surface tension of the radiation curable inkjet ink is preferably in the range of 18 to 70 mN/m at 25° C., more preferably in the range of 20 to 40 mN/m at 25° C.

Adhesion Promoter

The radiation curable inkjet ink comprises an adhesion promoter including:
  a polymerizable group selected from the group consisting of an acrylate, a methacrylate, an acrylamide, a methacrylamide, a styrene, a maleimide, a vinyl ether and a vinyl ester, and
  an adhesion promoting group including at least one nitrogen containing five or six membered heteroaromatic ring.

The nitrogens of the nitrogen containing five or six membered heteroaromatic ring are preferably not covalently bonded to a hydrogen.

The nitrogen containing five or six membered heteroaromatic ring is preferably selected from an N-alkylated imidazole, an N-alkylated benzimidazole, a pyridine, a quinoline and an isoquinoline, more preferably from a pyridine and an N-alkylated imidazole. Most preferably the nitrogen containing five or six membered heteroaromatic ring is an N-alkylated imidazole.

The nitrogen containing five or six membered heteroaromatic ring preferably has a pKa of the conjugated acid of at least 3.5, more preferably of at least 4.5.

The ethylenically unsaturated bond is preferably selected from the group consisting of an acrylate, a methacrylate, an acrylamide and a methacrylamide, more preferably from the group consisting of an acrylate and a methacrylate. The ethylenically unsaturated bond is most preferably an acrylate.

The adhesion promoter preferably includes at least two nitrogen containing five or six membered heteroaromatic ring.

In a preferred embodiment, the adhesion promoter is an oligomeric adhesion promoter.

In a more preferred embodiment, the adhesion promoter is an oligomeric adhesion promoter according to Formula I,

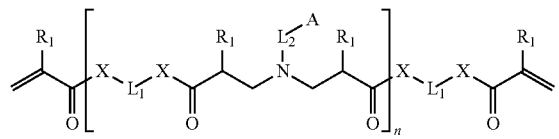

Formula I wherein

R$_1$ is selected from the group consisting of a hydrogen and a methyl group;

X is selected from the group consisting of an oxygen atom, a sulfur atom and NR$_2$;

L$_1$ represents a divalent linking group comprising no more than 15 carbon atoms;

L$_2$ represents a divalent linking group comprising no more than 8 carbon atoms;

R$_2$ represents a group selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group;

A represents a nitrogen containing five or six membered heteroaromatic ring.

L$_2$ preferably represents a substituted or unsubstituted alkylene group, more preferably an unsubstituted alkylene group, most preferably a C$_1$ to C$_6$ unsubstituted alkylene group.

X preferably represents an oxygen atom or NR$_2$, more preferably an oxygen atom.

R$_1$ preferably represents a hydrogen.

In another preferred embodiment the adhesion promoter is an adhesion promoter according to Formula II,

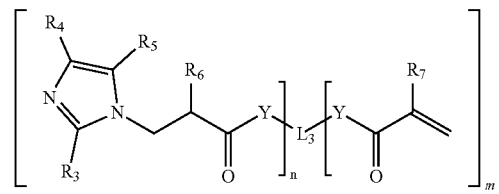

Formula II wherein

R$_3$ is selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group;

R$_4$ and R$_5$ are independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group;

R₄ and R₅ may represent the necessary atoms to form a five to eight membered ring;

R₆ and R₇ are independently selected from the group consisting of a hydrogen and a methyl group;

Y is selected from the group consisting of an oxygen atom, a sulfur atom and NR₈;

R₈ is selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group;

L₃ represents a n+m valent linking group, with the proviso that n+m is 6 or less; n and m independently represent an integer from 1 to 5.

Y preferably represent an oxygen atom.

R₄ and R₅ are preferably selected from the group consisting of a hydrogen and a substituted or unsubstituted alkyl group, more preferably a hydrogen.

R₆, R₇ and R₈ preferably represent a hydrogen.

R₃ is preferably selected from the group consisting of a hydrogen and a substituted or unsubstituted alkyl group, more preferably a hydrogen and a C₁ to C₆ alkyl group.

Typical adhesion promoters according to the present invention are given in Table 1 below.

TABLE 1

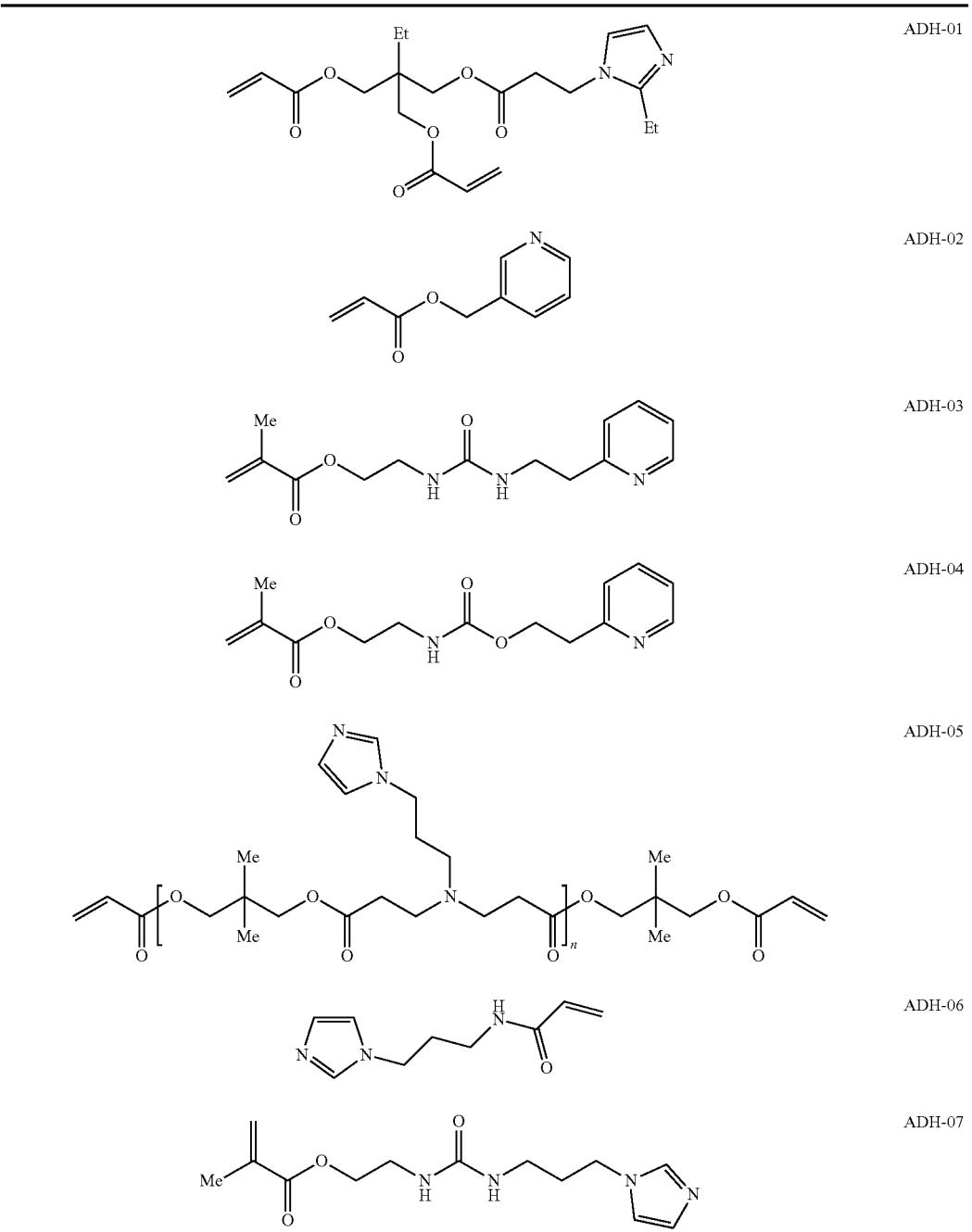

TABLE 1-continued
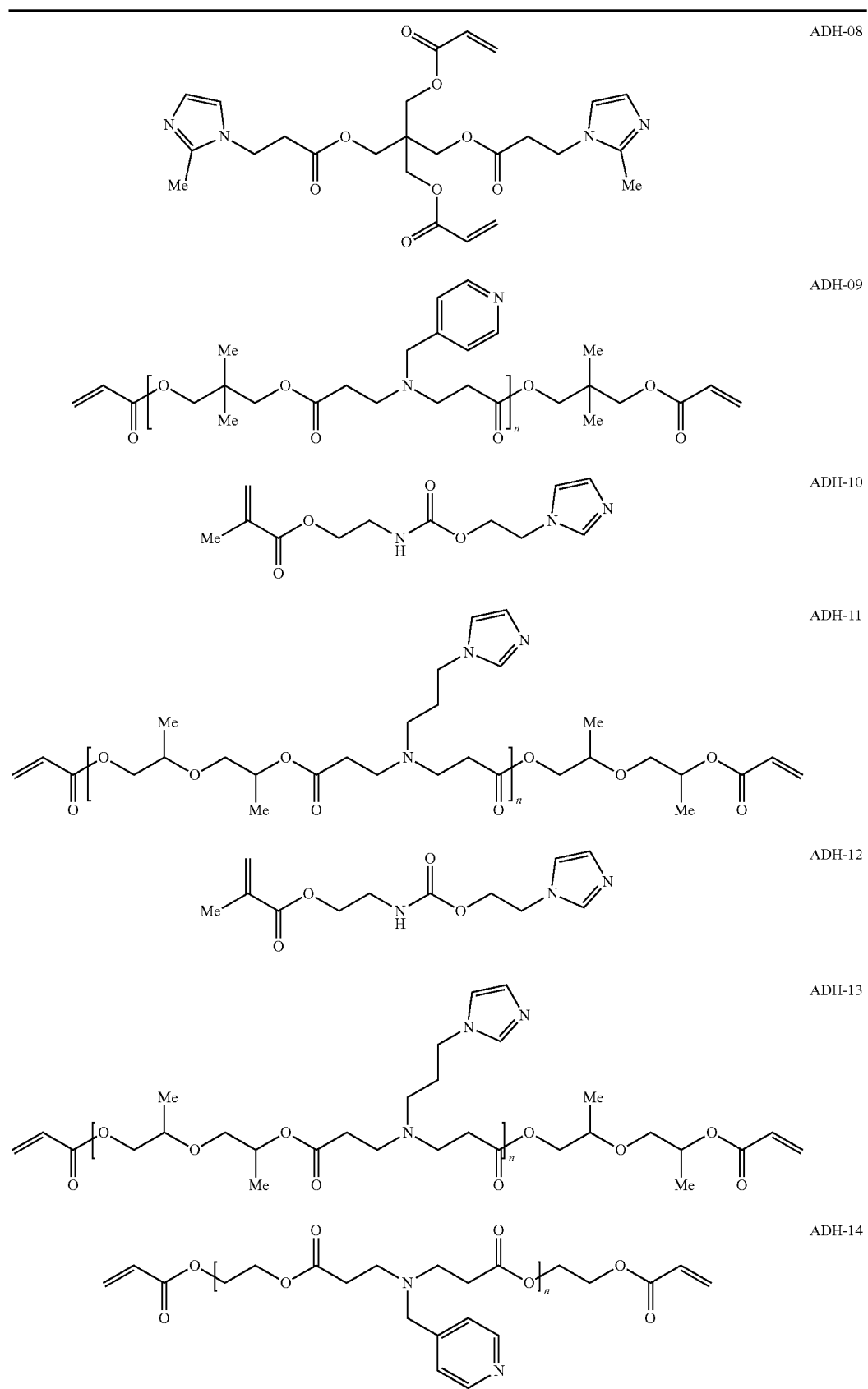

TABLE 1-continued

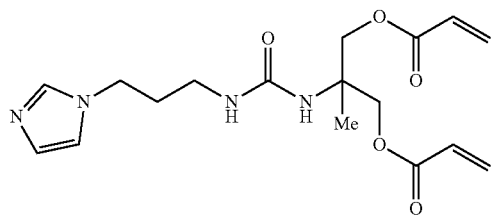 [SMILES: C=CC(=O)OCC(C)(COC(=O)C=C)NC(=O)NCCCn1ccnc1]

ADH-15

The amount of the adhesion promoter described above is preferably from 0.1 to 10 wt %, more preferably from 0.25 to 5 wt %, most preferably from 0.5 to 2.5 wt %, all relative to the total weight of the radiation curable composition.

The radiation curable composition may include further adhesion promoter, such as for example acrylic acid or other acid containing acrylates. Such further adhesion promoters are preferably selected from a monofunctional alkoxysilane compound and a di- or multifunctional alkoxysilane compound described below.

Further Adhesion Promoters

The radiation curable composition may include further adhesion promoters. Such further adhesion promoters are preferably selected from a monofunctional alkoxysilane compound and a di- or multifunctional alkoxysilane compound described below.

Monofunctional Alkoxysilane Compound

The radiation curable inkjet ink preferably includes a monofunctional alkoxysilane functionalized with a cyclic ether group selected from the group consisting of an epoxide and an oxetane. The cyclic ether is preferably an epoxide.

The monofunctional alkoxysilane includes at least one alkoxy group, more preferably at least two alkoxy groups and most preferably three alkoxy groups.

The alkoxy groups are preferably $C_1$ to $C_4$ alkoxy groups, more preferably methoxy, ethoxy or isopropoxy groups, most preferably methoxy or ethoxy groups.

Typical examples of monofunctional alkoxysilanes functionalized with a cyclic ether group selected from the group consisting of an epoxide and an oxetane are given in Table 2.

TABLE 2

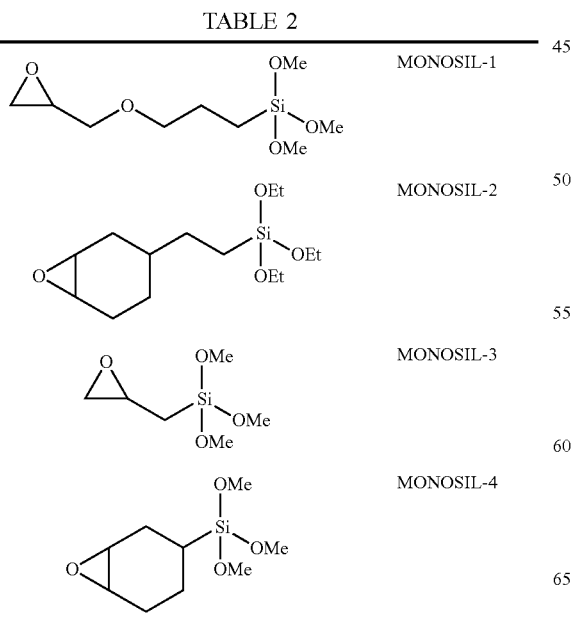

MONOSIL-1

MONOSIL-2

MONOSIL-3

MONOSIL-4

TABLE 2-continued

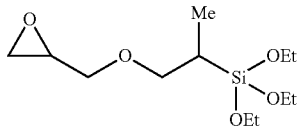 [SMILES: CCO[Si](OCC)(OCC)C(C)COCC1CO1] MONOSIL-5

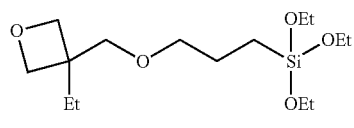 [SMILES: CCO[Si](CCCOCC1(CC)COC1)(OCC)OCC] MONOSIL-6

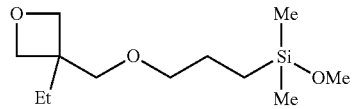 [SMILES: CCC1(COCCC[Si](C)(C)OC)COC1] MONOSIL-7

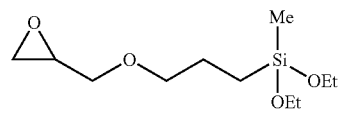 [SMILES: CCO[Si](C)(CCCOCC1CO1)OCC] MONOSIL-8

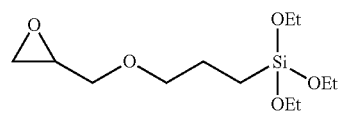 [SMILES: CCO[Si](CCCOCC1CO1)(OCC)OCC] MONOSIL-9

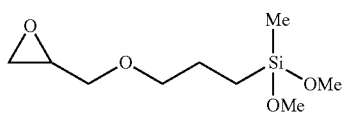 [SMILES: CO[Si](C)(CCCOCC1CO1)OC] MONOSIL-10

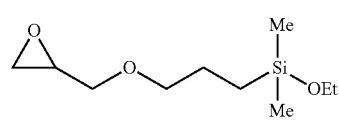 [SMILES: CCO[Si](C)(C)CCCOCC1CO1] MONOSIL-11

The amount of the monofunctional alkoxysilane compound is preferably between 0.1 and 10 wt %, more preferably between 0.5 and 7.5 wt %, most preferably between 1 and 5 wt %, all relative to the total weight of the inkjet ink.

Di- or Multifunctional Alkoxysilane Compound

The radiation curable composition preferably includes a di- or multifunctional alkoxysilane compound.

The di- or multifunctional alkoxysilane preferably has at least two alkoxysilane moieties according to Formula III,

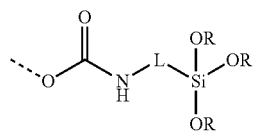

Formula III wherein

L represents a divalent linking group selected from the group consisting of a substituted or unsubstituted alkylene group, a substituted or unsubstituted alkenylene group, a substituted or unsubstituted alkynylene group and a substituted or unsubstituted arylene group;

R represents a group selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

L preferably represents a substituted or unsubstituted alkylene group, more preferably an unsubstituted alkylene group, most preferably a propylene group.

R preferably represents a substituted or unsubstituted alkyl group, more preferably an unsubstituted alkyl group, most preferably a $C_1$ to $C_6$ alkyl group, particularly preferred a methyl or an ethyl group.

Typical examples of di- or multifunctional alkoxysilanes are given in Table 3.

TABLE 3

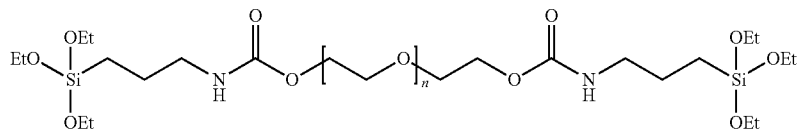

MULTISIL-1 n = 4 on average

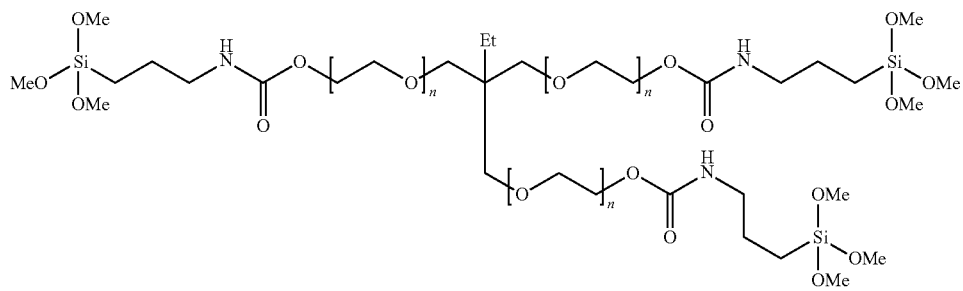

MULTISIL-2 n = 2 on average

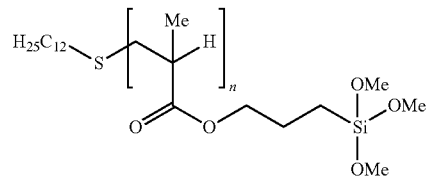

MULTISIL-3

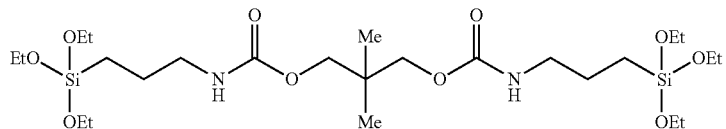 [SMILES: CCO[Si](CCCNC(=O)OCC(C)(C)COC(=O)NCCC[Si](OCC)(OCC)OCC)(OCC)OCC]

MULTISIL-4

TABLE 3-continued

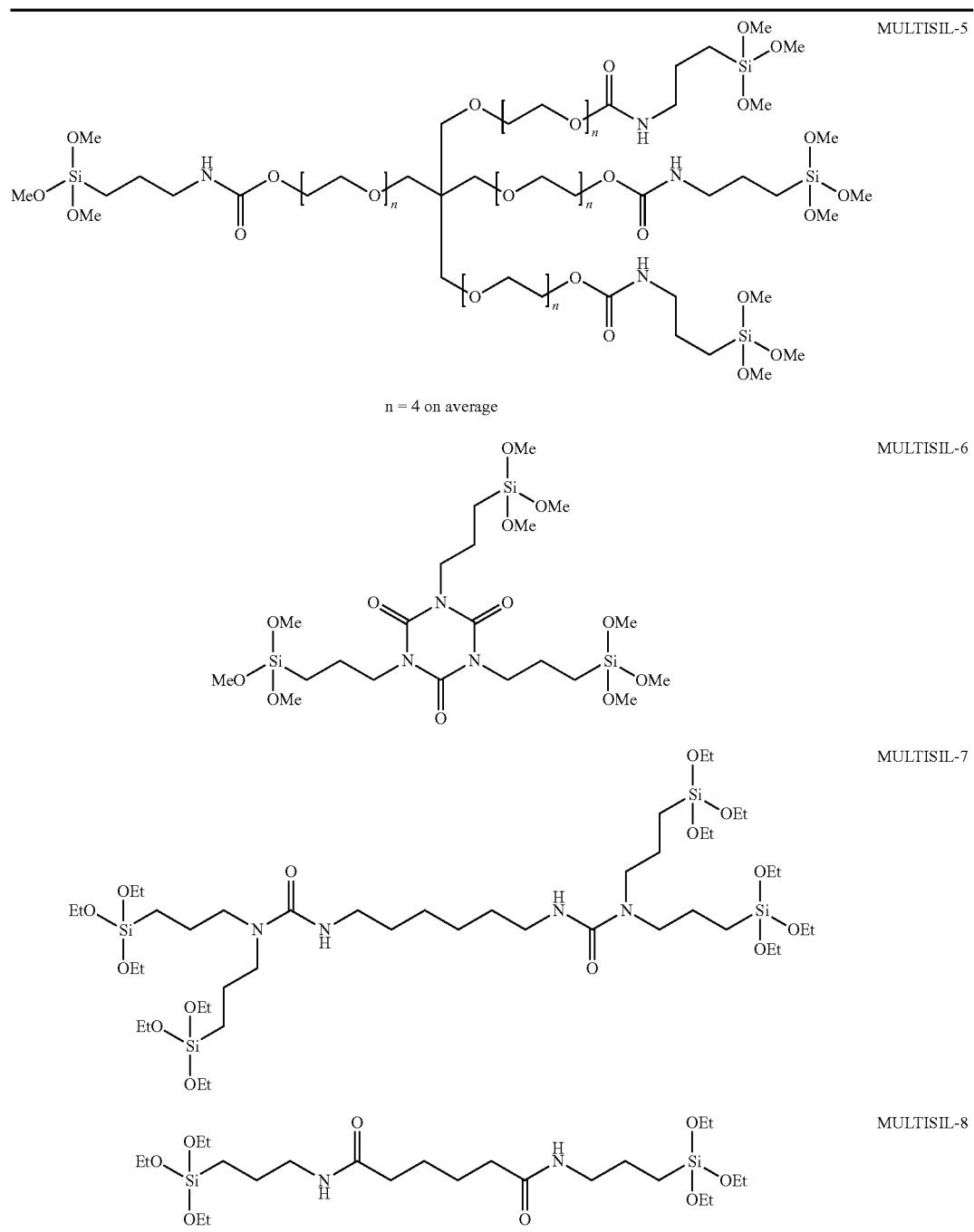

n = 4 on average

Particularly preferred di- or multifunctional alkoxysilanes are poly(urethane silane) hybrid crosslinkers as disclosed in European Coating Journal, 2014 (7/8), 21-25).

Such compounds are commercially available as the VESTANAT® EP-MF product range from Evonik.

The amount of the di- or multifunctional alkoxysilane compound is preferably between 0.1 and 10 wt %, more preferably between 0.5 and 7.5 wt %, most preferably between 1 and 5 wt %, all relative to the total weight of the inkjet ink.

The radiation curable composition may include further adhesion promoters, such as acrylic acid or other carboxylic acid group containing acrylates.

The total amount of adhesion promoters is preferably between 0.1 and 20 wt %, more preferably between 0.5 and 15 wt %, most preferably between 1 and 10 wt %, all relative to the total weight of the inkjet ink.

When the amount is too low, the adhesion of the inkjet ink may be insufficient, when the amount is too high, the ink viscosity may increase and the shelf life of the ink may become more critical.

Photoinitiators

The radiation curable inkjet ink preferably includes a photoinitiator, preferably a free radical photoinitiator.

A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photoinitiators are disclosed in CRIVELLO, J. V., et al. Photoinitiators for Free Radical, Cationic and Anionic Photopolymerization. 2nd edition. Edited by BRADLEY, G. London, UK: John Wiley and Sons Ltd, 1998. p. 276-293.

Specific examples of free radical photoinitiators may include, but are not limited to, the following compounds or combinations thereof: benzophenone and substituted benzophenones; 1-hydroxycyclohexyl phenyl ketone; thioxanthones such as isopropylthioxanthone; 2-hydroxy-2-methyl-1-phenylpropan-1-one; 2-benzyl-2-dimethylamino-(4-morpholinophenyl) butan-1-one; benzyl dimethylketal; 2-methyl-1-[4-(methylthio) phenyl]-2-morpholinopropan-1-one; 2,2-dimethoxy-1, 2-diphenylethan-1-one or 5,7-diiodo-3-butoxy-6-fluorone.

A preferred photoinitiator is an acylphosphine oxide compound. The acylphosphine oxide compound may be selected from the group consisting of a mono-acylphosphine oxide and a di-acylphosphine oxide. Preferred acylphosphine oxide photoinitiators are diphenyl(2,4,6-trimethylbenzoyl) phosphine oxide (TPO), ethyl (2,4,6-trimethylbenzoyl) phenyl phosphinate (TPO-L), phenylbis(2,4,6-trimethylbenzoyl)phosphine oxide) (BAPO), bis (2,6-dimethyl-benzoyl)-2,4,4-trimethylpentylphosphine oxide and 2,4,6-trimethoxybenzoyl-diphenylphosphine oxide.

Other preferred photoinitiators are α-hydroxy-ketone Type I photoinitiators such as for example oligo[2-hydroxy-2-methyl-1-[4-(1-methylvinyl-phenyl]propanone] available as Esacure® KIP IT from IGM resins.

A preferred amount of photoinitiator is from 0.2 up to 20 wt %, more preferably from 0.5 up to 10 wt %, most preferably from 1 up to 8 wt %, particularly preferred from 1.5 up to 6 wt %, all relative to the total weight of the radiation curable inkjet ink.

In order to increase the photosensitivity further, the radiation curable inkjet ink may additionally contain co-initiators. Suitable examples of co-initiators can be categorized in three groups:

(1) tertiary aliphatic amines such as methyldiethanolamine, dimethylethanolamine, triethanolamine, triethylamine and N-methylmorpholine;
(2) aromatic amines such as amylparadimethyl-aminobenzoate, 2-n-butoxyethyl-4-(dimethylamino) benzoate, 2-(dimethylamino)-ethylbenzoate, ethyl-4-(dimethyl-amino)benzoate, and 2-ethylhexyl-4-(dimethylamino)benzoate; and
(3) (meth)acrylated amines such as dialkylamino alkyl (meth)acrylates (e.g., diethyl-aminoethylacrylate) or N-morpholinoalkyl-(meth)acrylates (e.g., N-morpholinoethyl-acrylate).

Preferred co-initiators are aminobenzoates.

A preferred low molecular aminobenzoate is Genocure® EPD from RAHN.

Particularly preferred aminobenzoate co-initiators are selected from the group consisting of polymerisable, oligomeric and polymeric aminobenzoate co-initiators.

Polymerisable co-initiators are disclosed in EP-A 2033949 (Agfa Graphics N.V.).

In a more preferred embodiment, the aminobenzoate co-initiators are oligomeric aminobenzoate derivatives.

Particularly preferred aminobenzoates are polyether derivatives of aminobenzoates, wherein the polyether is selected from the group consisting of poly(ethylene oxide), poly(propylene oxide), copolymers thereof, and poly(tetrahydrofuran), ethoxylated or propoxylated neopentyl glycol, ethoxylated or propoxylated trimethylpropane and ethoxylated or propoxylated pentaerythritol.

Preferred oligomeric aminobenzoates are disclosed in WO1996/33157 (Lambson Fine Chemicals Ltd.) and WO2011/030089 (Sun Chemicals B.V.). Typical examples of polyethylene glycol bis p-dimethylaminobenzoate are OMNIPOL ASA, commercially available from IGM Resins and Speedcure 7040, commercially available from Lambson Fine Chemicals.

Other oligomeric or polymeric co-initiators are for example ESACURE A198, a polyfunctional amine from IGM and SARTOMER® CN3755, an acrylated amine co-initiator from ARKEMA.

Polymerizable Compounds

The radiation curable composition includes at least one polymerizable compound.

The polymerizable compounds are preferably free radical polymerizable compounds.

The free radical polymerizable compounds may be monomers, oligomers and/or prepolymers. Monomers are also referred to as diluents.

These monomers, oligomers and/or prepolymers may possess different degrees of functionality, i.e. a different amount of free radical polymerizable groups.

A mixture including combinations of mono-, di-, tri- and higher functional monomers, oligomers and/or prepolymers may be used. The viscosity of the radiation curable inkjet ink may be adjusted by varying the ratio between the monomers and oligomers.

In a preferred embodiment, the monomer, oligomer or polymer includes at least one acrylate group as polymerizable group.

Preferred monomers and oligomers are those listed in paragraphs [0106] to [0115] in EP-A 1911814.

In a preferred embodiment, the radiation curable inkjet ink comprises a monomer containing a vinyl ether group and an acrylate or methacrylate group. Such monomers are disclosed in EP-A 2848659, paragraphs [0099] to [0104]). A particular preferred monomer containing a vinyl ether group and an acrylate group is 2-(2-vinyloxyethoxy)ethyl acrylate.

The polymerizable compound is preferably selected from the group consisting of acryloyl morpholine, cyclic trimethyl propane formol acrylate, isobornyl acrylate, lauryl acrylate, dipropylene glycol diacrylate, trimethylol propane triacrylate, 2-(vinylethoxy)ethyl acrylate and urethane acrylate.

Phenolic Compound

The radiation curable inkjet ink preferably comprises a phenolic compound, more preferably a phenolic compound comprising at least two phenolic groups, as disclosed in WO2018/087056 (Agfa Gevaert, Electra Polymers) in paragraphs [053] to [068].

The amount of phenolic compounds is preferably between 0.5 and 20 wt %, more preferably between 1 and 15 wt %, most preferably between 2.5 and 10 wt %, relative to the total weight of the inkjet ink.

Colorants

The radiation curable inkjet may be a substantially colourless inkjet ink or may include at least one colorant. For example when the inkjet ink is used as etch resist, the colorant makes the temporary mask clearly visible to the manufacturer of conductive patterns, allowing a visual inspection of quality. When the inkjet ink is used to apply a solder mask it typically contains a colorant. A preferred colour for a solder mask is green, however other colours such as black or red may also be used.

The colorant may be a pigment or a dye.

A colour pigment may be chosen from those disclosed by HERBST, Willy, et al. Industrial Organic Pigments, Production, Properties, Applications. 3rd edition. Wiley—VCH, 2004. ISBN 3527305769. Suitable pigments are disclosed in paragraphs [0128] to [0138] of WO2008/074548.

Pigment particles in inkjet inks should be sufficiently small to permit free flow of the ink through the inkjet-printing device, especially at the ejecting nozzles. It is also desirable to use small particles for maximum colour strength and to slow down sedimentation. Most preferably, the average pigment particle size is no larger than 150 nm. The average particle size of pigment particles is preferably determined with a Brookhaven Instruments Particle Sizer BI90plus based upon the principle of dynamic light scattering.

Generally dyes exhibit a higher light fading than pigments, but cause no problems on jettability. It was found that anthraquinone dyes exhibit only minor light fading under the normal UV curing conditions used in UV curable inkjet printing. In a preferred embodiment, the colorant in the radiation curable inkjet ink is an anthraquinone dye, such as Macrolex™ Blue 3R (CASRN 325781-98-4) from LANXESS.

Other preferred dyes include crystal violet and a copper phthalocyanine dye.

In a preferred embodiment, the colorant is present in an amount of 0.5 to 6.0 wt %, more preferably 1.0 to 2.5 wt %, based on the total weight of the radiation curable inkjet ink.

Polymeric Dispersants

If the colorant in the radiation curable inkjet is a pigment, then the radiation curable inkjet preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:
- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on "Dispersants", more specifically [0064] to [0070] and [0074] to [0077], in EP-A 1911814.

Commercial examples of polymeric dispersants are the following:
- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MUNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Polymerization Inhibitors

The radiation curable inkjet ink may contain at least one inhibitor for improving the thermal stability of the ink.

Suitable polymerization inhibitors include phenol type antioxidants, hindered amine light stabilizers, phosphor type antioxidants, hydroquinone monomethyl ether commonly used in (meth)acrylate monomers, and hydroquinone, t-butyl-catechol, pyrogallol, 2,6-di-tert.butyl-4-methylphenol (=BHT) may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors may lower the curing speed, it is preferred that the amount capable of preventing polymerization is determined prior to blending. The amount of a polymerization inhibitor is preferably lower than 5 wt %, more preferably lower than 3 wt % of the total radiation curable inkjet ink.

Surfactants

The radiation curable inkjet ink may contain at least one surfactant.

The surfactant can be anionic, cationic, non-ionic, or zwitter-ionic and is usually added in a total quantity less than 1 wt % based on the total weight of the radiation curable inkjet ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoric surfactants (such as fluorinated hydrocarbons) and silicone surfactants. The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferably the surfactant is present in the radiation curable inkjet ink in an amount of 0 to 3 wt % based on the total weight of the radiation curable inkjet ink.

Flame Retardant

The radiation curable inkjet ink preferably comprises a flame retardant.

Preferred flame retardants are inorganic flame retardants, such as Alumina Trihydrate and Boehmite, and organophosphor compounds, such as organo-phosphates (e.g. triphenyl phosphate (TPP), resorcinol bis (diphenylphosphate) (RDP), bisphenol A diphenyl phosphate (BADP), and tricresyl phosphate (TCP)); organo-phosphonates (e.g. dimethyl methylphosphonate (DMMP)); and organophosphinates (e.g. aluminium dimethylphosphinate).

Other preferred organo-phosphor compounds are disclosed in U.S. Pat. No. 8,273,805 (JNC Corporation)) and EP-A 3498788 (Agfa Gevaert).

Preparation of Inkjet Inks

The preparation of pigmented radiation curable inkjet inks is well-known to the skilled person. Preferred methods of preparation are disclosed in paragraphs [0076] to [0085] of WO2011/069943.

Method of Manufacturing a Printed Circuit Board

The method of manufacturing a Printed Circuit Board (PCB) according to the present invention includes at least one inkjet printing step wherein a radiation curable inkjet ink as described above is jetted and cured on a substrate.

According to a preferred embodiment, the method of manufacturing a PCB comprises an inkjet printing step wherein a solder mask is provided.

The solder mask is provided by jetting and curing the radiation curable inkjet ink typically on a dielectric substrate containing an electrically conductive pattern.

A heat treatment is preferably applied to the jetted and cured radiation curable inkjet ink. The heat treatment is preferably carried out at a temperature between 80° C. and 250° C. The temperature is preferably not less than 100° C., more preferably not less than 120° C. To prevent charring of the solder mask, the temperature is preferably not higher than 200° C., more preferably not higher than 160° C.

The thermal treatment is typically carried out between 15 and 90 minutes.

The purpose of the thermal treatment is to further increase the polymerization degree of the solder mask.

The substrate is typically a dielectric substrate provided with an electrically conductive circuitry.

The dielectric substrate of the electronic device may be any non-conductive material. The substrate is typically a paper/resin composite or a resin/fibre glass composite, a ceramic substrate, a polyester or a polyimide. For flexible PCBs, the dielectric substrate is preferably a polyimide based substrate.

The electrically conductive circuitry is typically made from any metal or alloy which is conventionally used for preparing electronic devices such as gold, silver, palladium, nickel/gold, nickel, tin, tin/lead, aluminium, tin/aluminium and copper. The electrically conductive circuitry is preferably made from copper, more preferably untreated copper.

The radiation curable inkjet ink may be cured by exposing the ink to actinic radiation, such as electron beam or ultraviolet (UV) radiation. Preferably the radiation curable inkjet ink is cured by UV radiation, more preferably using UV LED curing.

The method of manufacturing a PCB may comprise two, three or more inkjet printing steps. For example the method may comprise two inkjet printing steps wherein an etch resist is provided on a metal surface in one inkjet printing step and wherein a solder mask is provided on a dielectric substrate containing an electrically conductive circuitry in another inkjet printing step.

A third inkjet printing step may be used for legend printing.

Inkjet Printing Devices

The radiation curable inkjet ink may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type.

The inkjet print head normally scans back and forth in a transversal direction across the moving ink-receiving surface (substrate). Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiving surface. In a single pass printing process the inkjet print heads usually remain stationary and the ink-receiving surface is transported under the inkjet print heads.

Curing Devices

The radiation curable inkjet ink can be cured by exposing them to actinic radiation, such as electron beam or ultraviolet radiation. Preferably the radiation curable inkjet ink is cured by ultraviolet radiation, more preferably using UV LED curing.

In inkjet printing, the curing means may be arranged in combination with the print head of the inkjet printer, travelling therewith so that the curable liquid is exposed to curing radiation very shortly after been jetted.

In such an arrangement, with the exception of UV LEDs, it can be difficult to provide a small enough radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

In a preferred embodiment, the radiation curable inkjet ink is cured by UV LEDs. The inkjet printing device preferably contains one or more UV LEDs preferably with a wavelength larger than 360 nm, preferably one or more UV LEDs with a wavelength larger than 380 nm, and most preferably UV LEDs with a wavelength of about 395 nm.

Furthermore, it is possible to cure the ink image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as ALDRICH CHEMICAL Co. (Belgium) and ACROS (Belgium) unless otherwise specified. The water used was deionized water.

DISP-1 is concentrated black pigment dispersion having a composition according to Table 4 and was prepared as follows:

TABLE 4

| Component | wt % |
|---|---|
| VEEA | 67.0 |
| PRESOL | 19.0 |
| INHIB | 9.1 |
| Special Black 550 | 4.1 |
| Sunfast Black 15 4 | 0.8 |

The concentrated black pigment dispersion DISP-1 was made by mixing in 235 g VEEA as liquid medium, 31.9 g Special Black 550, 14.6 g Sunfast Blue 15 4, 2.8 g of the inhibitor INHIB and 65.6 g PRESOL for 30 minutes in a vessel equipped with a DISPERLUX™ disperser (from DISPERLUX S.A.R.L., Luxembourg). This mixture was subsequently milled in a DYNO™-MILL RL from the company WAB Willy A. Bachofen (Switzerland) using 0.40 mm yttrium-stabilized zirconium oxide-beads. The bead mill was filled for 42% with the grinding beads and operated in recirculation mode for 188 minutes by using a tip speed of 11.8 m/s. The milling chamber was water-cooled during the operation. The average particles size was 116 nm.

VEEA is 2-(2-vinyloxyethoxy)ethyl acrylate available from NIPPON SHOKUBAI.

PRESOL was prepared by dissolving 429 g EFKA7701 in 633 g VEEA, followed by the addition of 10.7 g INHIB.

EFKA 7701 is a polymeric dispersing agent supplied by BASF.

INHIB is a mixture forming a polymerization inhibitor having a composition according to Table 5.

TABLE 5

| Component | wt % |
|---|---|
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminum N-nitrosophenylhydroxylamine from WAKO CHEMICALS LTD.

DPGDA is dipropylenediacrylate, available as Sartomer SR508 from ARKEMA.

ACMO is acryloyl morpholine available from RAHN.

EDIOXMA is a mixture of trimethylolformal acrylate and trimethylolpropane triacrylate, commercial as Photomer 4141, supplied by IGM Resins.

ISOPA is 3,3,5-trimethylcyclohexyl acrylate, commercial as Sartomer CD420, supplied by Arkema.

NK ESTER is 2-(acryloyloxy)ethyl succinate, supplied by KOWA Europe GMBH.

MONOSIL-1 is 3-glycidoxypropyltrimethoxy silane available as Silane Z-6040 from DOW CORNING.

MULTISIL-9 is di-functional alkoxysilane available as Vestanat® EP-MF-204 from EVONIK.

BAPO is a bis(2,4,6-trimethylbenzoyl)-phenylphosphineoxide photoinitiator available as Irgacure™ 819 from BASF ITX is Speedcure™ ITX, a mixture of isopropyl thioxanthone isomers, from LAMBSON SPECIALTY CHEMICALS TPO is a 2,4,6-trimethylbenzoyl diphenylphosphine oxide, commercially available as Genocure TPO, supplied by Rahn AG Omnipol ASA is a 4-dimethyl-benzoic acid ester of a low molecular weight poly(ethylene glycol) supplied by IGM Resins Ebecryl 1360 is a polysiloxane hexaacrylate slip agent from ALLNEX.

FR01 is a flame retardant commercially available under tradename ADK Stab FP600 from ADEKA PALMAROL.

Methods

Adhesion of the Inkjet Inks

The adhesion was evaluated according to the ISO2409: 1992 Paints and varnishes cross-cut test (International standard 1992-08-15) using a Braive No. 1536 Cross Cut Tester from BRAIVE INSTRUMENTS with a spacing of a 1 mm between cuts in combination with a Tesatape™ 4104 PVC tape.

The evaluation was made in accordance with a criterion described in Table 6, where both the adhesion in the cross-cut and outside the cross-cut were evaluated.

TABLE 6

| Evaluation value | Criterion |
|---|---|
| 0 | Nothing removed, perfect adhesion. |
| 1 | Detachment of only very small parts of the cured layer, almost perfect adhesion. |
| 2 | Minor parts of the cured layer was removed by the tape, good adhesion |
| 3 | Parts of the cured layer were removed by the tape, poor adhesion. |
| 4 | Most of the cured layer was removed by the tape, poor adhesion. |
| 5 | The cured layer was completely removed from the substrate by the tape, no adhesion. |

Solder Resistance

The solder resistance of the inkjet inks was evaluated using a SPL600240 Digital Dynamic Solder Pot available from L&M PRODUCTS filled with a "K" Grade 63:37 tin/lead solder available from SOLDER CONNECTION. The temperature of the solder was set at 290° C.

Using a Q-tip, a solder flux SC7560A from SOLDER CONNECTION was applied on the surface of the samples (i.e. coatings of the inkjet ink on a copper surface as described under adhesion) to clean the surface. The solder flux was dried by placing the samples for 10 minutes above the solder pot.

After placing the sample in the solder pot, a solder wave was created for 10 seconds. This was reproduced 3 times in total after which the samples were cooled for at least 10 minutes.

The adhesion of the inkjet inks was then evaluated as described above.

ENIG Resistance

First of all, the boards were dipped in a bath of acid cleaner (Umicore cleaner 865) at 40° C. during 4 min. The boards were then removed and dipped in a rinsing bath of deionized water (DW) at room temperature (RT) during 90 s.

Secondly the boards were dipped in a microetching bath comprising 8.5 wt % Na2S208 and ±3.2 wt % H2S04 (98%) in water at a temperature between 26-33° C. for 100 s. The boards were then removed and dipped in a rinsing bath of DW at RT during 90 s.

Thirdly the boards were dipped in a palladium activator bath (Accemulta MKN 4) at a temperature around 30° C. for 90 s. The boards were then removed and dipped in a rinsing bath of DW at RT during 90s.

Then the boards were dipped in a nickel bath (Nimuden NPR 4) at a temperature around 85° C. for 35 min. The boards were then removed and dipped in a rinsing bath of DW at RT during 90 s.

Finally, the boards were dipped in a gold bath (Gobright TAM 55) at a temperature around 80° C. for 12 min. The boards were then removed and dipped in a rinsing bath of DW at RT during 90 s.

The adhesion of the inkjet inks was then evaluated as described above.

Example 1

This example illustrates the synthesis of the adhesion promoters according to the invention.

Synthesis of ADH-01

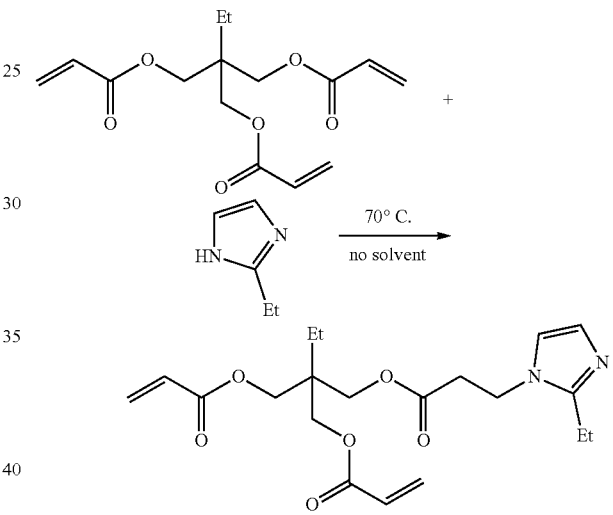

14.4 g (0.15 mol) 2-ethyl-imidazole was added to 44.4 g ((0.15 mol) trimethylolpropane triacrylate and the mixture was heated to 70° C. for 4 hours. The mixture was allowed to cool down to room temperature and ADH-1 was used as adhesion promoter without further purification. ADH-1 was analyzed using LC-MS. The main components of the mixture are listed below in Table 7.

TABLE 7

| Chemical Structure | Area (%) |
|---|---|
|  | 20.0 |

TABLE 7-continued

| Chemical Structure | Area (%) |
|---|---|
| (structure) | 34.5 |
| (structure) | 18.0 |
| (structure) | 3.5 |

The Synthesis of ADH-2

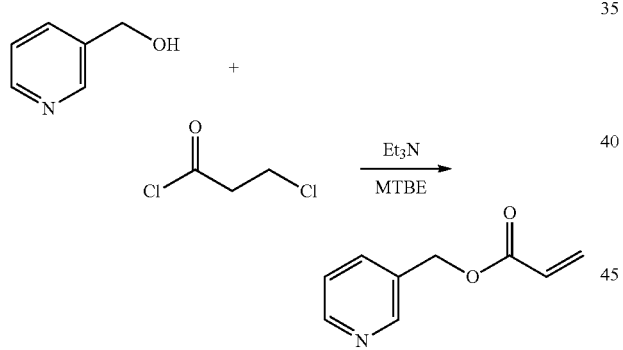

40 g (0.36 mol) 3-hydroxymethyl-pyridine was dissolved in 600 ml methyl tert.butyl ether. 101 ml (73 g, 0.72 mol) triethyl amine was added. The mixture was cooled to −4° C. 34 ml (45 g, 0.36 mol) 3-chloro-proionyl chloride was added dropwise over 45 minutes while keeping the temperature below 5° C. The reaction was allowed to continue for 72 hours at room temperature. The reaction mixture was extracted twice with 500 ml water and 300 ml water. The pooled water fractions were extracted with 300 ml methyl tert.butyl ether. The methyl tert.butyl ether fractions were pooled, dried over $MgSO_4$ and evaporated under reduced pressure.

The crude ADH-2 was purified by preparative column chromatography on a Graceresolv RS80 column, using a gradient elution from hexane/methylene chloride 50/50 to hexane/ethyl acetate 50/50.

11.2 g of ADH-2 was isolated (TLC analysis on TLC Silica gel 60F$_{254}$ supplied by Merck, eluent: hexane/ethyl acetate 50/50, $R_f$: 0.45)

The Synthesis of ADH-3

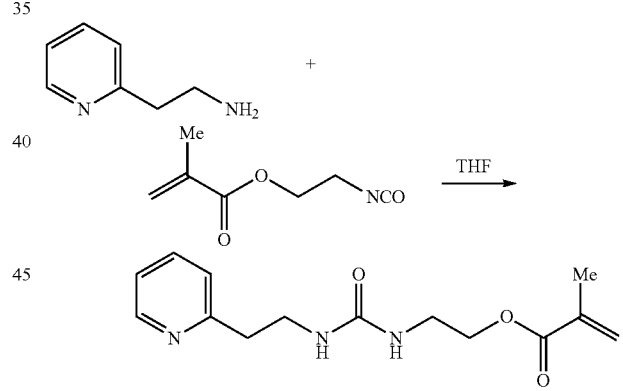

39 g (0.32 mol) 2-(2-aminoethyl)pyridine was dissolved in 350 ml tetrahydrofurane. 0.35 g BHT was added as stabilizer and the mixture was cooled to −5° C. 51.1 g (0.33 mol) 2-isocyanatoethyl methacrylate was added while maintaining the temperature below 0° C. The reaction was allowed to continue for 30 minutes at 0° C., followed 30 minutes at room temperature. The solvent was removed under reduced pressure. The residue was treated with ethyl acetate and further treated with hexane.

The crude ADH-3 was isolated and purified by preparative column chromatography on a Prochrom LC80 column, using Kromasil Si60A 10 μm as stationary phase and methylene chloride/ethanol 85/15 as eluent.

57.5 g (yield: 65%) of ADH-3 was isolated (TLC analysis on TLC Silica gel 60F$_{254}$ supplied by Merck: eluent methylene chloride/ethanol 85/15: $R_f$=0.51).

The Synthesis of ADH-4

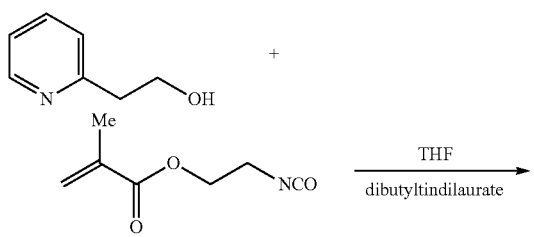

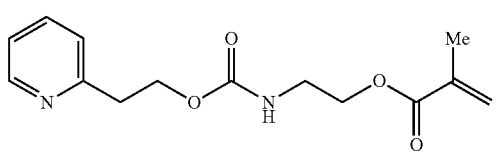

39 g (0.32 mol) 2-(2-hydroxyethyl)pyridine was dissolved in 350 ml ethyl acetate. 0.35 g BHT and 0.25 g dibutyl tin dilaurate were added and the mixture was cooled to −5° C. 51.6 g (0.33 mol) 2-isocyanatoethyl methacrylate was added while maintaining the temperature at −5° C. The reaction was allowed to continue at room temperature for 16 hours.

The solvent was removed under reduced pressure and the residue was treated with ethyl acetate. The mixture was concentrated to 100 ml and ADH-4 slowly crystallized.

The crystallized ADH-4 was isolated, treated with ethyl acetate, isolated an dried. 83 g (yield: 93%) of ADH-4 was isolated.

The Synthesis of ADH-5

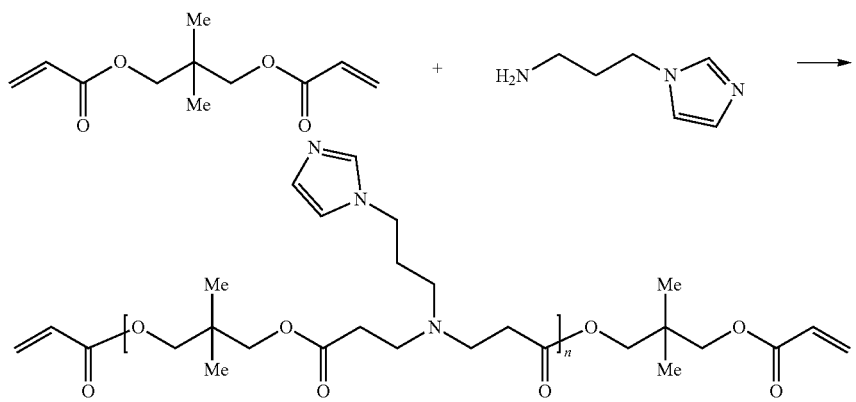

7.15 g (30 mmol) neopentyl glycol diacrylate was dissolved in 30 ml ethylacetate. 0.11 g BHT was added as stabilizer. 3.08 g (24 mmol) 1-(3-aminopropyl)-imidazool was added over 15 minutes. The reaction mixture was heated to reflux and the reaction was allowed to continue for 16 hours at reflux.

The mixture was allowed to cool down to room temperature and the solvent was removed under reduced pressure.

9.48 g (yield: 93%) of ADH-5 was isolated as a viscous oil and used without further purification.

Example 2

This examples illustrates the improved adhesion of the cured inkjet inks according to the invention towards untreated copper and the improved solder- and ENIG resistance of such cured inkjet inks.

Preparation of Comparative Inks COMP-1 and Inventive Inks INV-1 to INV-5

The comparative radiation curable inkjet ink COMP-1 and the inventive radiation curable inkjet inks INV-1 to INV-5 were prepared according to Table 8. The weight percentages (wt %) are all based on the total weight of the radiation curable inkjet ink.

TABLE 8

| wt % of component | INV-01 | INV-02 | INV-03 | INV-04 | INV-05 | COMP-01 |
|---|---|---|---|---|---|---|
| DISP-1 | 12.0 | = | = | = | = | = |
| ACMO | 20.0 | = | = | = | = | = |
| VEEA | 18.5 | = | 19.5 | = | 19.0 | 20.0 |
| EDIOXMA | 10.0 | = | = | = | = | = |
| ISOPA | 5.0 | = | = | = | = | = |
| NK ESTER | 3.0 | = | = | = | = | = |
| ADH-1 | 1.5 | — | — | — | — | — |
| ADH-2 | — | 1.5 | — | — | — | — |
| ADH-3 | — | — | 0.5 | — | — | — |
| ADH-4 | — | — | — | 0.5 | — | — |
| ADH-5 | — | — | — | — | 1.0 | — |
| MONOSIL-1 | 8.0 | = | = | = | = | = |
| MULTISIL-9 | 2.0 | = | = | = | = | = |
| Acrylic Acid | 1.0 | = | = | = | = | = |
| BAPO | 4.0 | = | = | = | = | = |
| ITX | 3.0 | = | = | = | = | = |
| TPO | 3.0 | = | = | = | = | = |
| Omnipol ASA | 6.0 | = | = | = | = | = |
| FR01 | 2.0 | = | = | = | = | = |

TABLE 8-continued

| wt % of component | INV-01 | INV-02 | INV-03 | INV-04 | INV-05 | COMP-01 |
|---|---|---|---|---|---|---|
| Ebecryl 1360 | 0.1 | = | = | = | = | = |
| INHIB | 0.9 | = | = | = | = | = |

The comparative sample COMP-01 and the inventive samples INV-A to INV-06 were obtained by jetting the inks using Microcraft MJP 2013 K1 (resolution 720 by 1440 dpi 3 times multiple pass, at 45° C. jetting temperature, 50% pincure after each pass using a LED 395 nm 8 W lamp) to obtain a soldermask layer having a final thickness of +/−22 μm. After printing the samples were baked in an oven at 150° C. for 1 hour.

The Adhesion to untreated copper and the SOLDER- and ENIG resistance of the cured inks were tested as described above. The results are shown in Table 9.

TABLE 9

| UV curable inkjet ink | Adhesion untreated Copper | SOLDER Resistance | ENIG Resistance |
|---|---|---|---|
| INV-1 | 1 | 0 | 0 |
| INV-2 | 1 | 0 | 0 |
| INV-3 | 2 | 0 | 0 |
| INV-4 | 1 | 1 | 0 |
| INV-5 | 1 | 0 | 0 |
| COMP-1 | 4 | 2 | 4 |

It is clear from the results of Table 9 that an adhesion promoter comprising at least one ethylenically unsaturated bond and one nitrogen containing five or six membered heteroaromatic ring significantly improves the soldermask performance on untreated copper of an inkjet ink.

The invention claimed is:

1. A radiation curable composition comprising at least one polymerizable compound and an adhesion promoter,
wherein the adhesion promoter has a chemical structure according to Formula II:

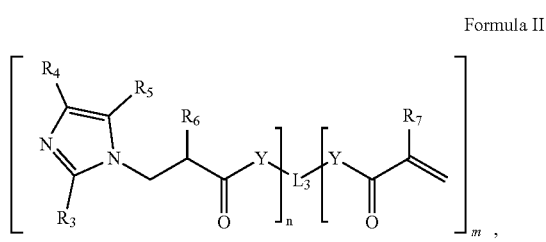

Formula II wherein
R$_3$ is selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, and a substituted or unsubstituted aryl or heteroaryl group;
R$_4$ and R$_5$ are each independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, and a substituted or unsubstituted aryl or heteroaryl group, or R$_4$ and R$_5$ together may represent the necessary atoms to form a five to eight membered ring;
R$_6$ and R$_7$ are each independently selected from the group consisting of a hydrogen and a methyl group;
Y is selected from the group consisting of an oxygen atom, a sulfur atom, and NR$_8$;
R$_8$ is selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, and a substituted or unsubstituted aryl or heteroaryl group;
L$_3$ represents a n+m valent linking group, with the proviso that n+m is 6 or less; and n and m each independently represent an integer from 1 to 5, wherein the composition is an inkjet ink.

2. The radiation curable composition of claim 1, further comprising a silane compound selected from a di- or multifunctional alkoxysilane and a monofunctional alkoxysilane functionalized with a group selected from the group consisting of an epoxide and an oxetane.

3. The radiation curable composition of claim 2, wherein the di-or multifunctional alkoxysilane includes at least two alkoxysilane moieties according to Formula III:

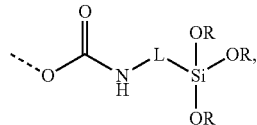

Formula III wherein
L represents a divalent linking group selected from the group consisting of a substituted or unsubstituted alkylene group, a substituted or unsubstituted alkenylene group, a substituted or unsubstituted alkynylene group, and a substituted or unsubstituted arylene group; and
each R independently represents a group selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group, and a substituted or unsubstituted aryl or heteroaryl group.

4. The radiation curable composition of claim 3, wherein the polymerizable compound is selected from the group consisting of acryloyl morpholine, trimethylolformal acrylate, trimethylolpropane triacrylate, 3,3,5-trimethylcyclohexyl acrylate, isobornyl acrylate, dipropylene glycol diacrylate, trimethylol propane triacrylate, 2-(acryloyloxy) ethyl succinate, and 2-(2-vinyloxyethoxy) ethyl acrylate.

5. A method of manufacturing a Printed Circuit Board (PCB) including an inkjet printing step wherein a radiation curable composition as defined in claim 4 is jetted and cured on a substrate.

6. The method of claim 5, wherein curing is carried out using LED UV radiation.

7. The method of claim 5, wherein the inkjet printing step includes solder mask printing.

8. The method of claim 5, further comprising a heating step.

9. The method of claim 5, wherein the substrate is a dielectric substrate provided with an electrically conductive circuitry.

10. The method of claim 9, wherein the dielectric substrate is a polyimide based substrate.

11. The radiation curable composition of claim 1, wherein the polymerizable compound is selected from the group consisting of acryloyl morpholine, trimethylolformal acrylate, trimethylolpropane triacrylate, 3,3,5-trimethylcyclohexyl acrylate, isobornyl acrylate, dipropylene glycol diacrylate, trimethylol propane triacrylate, 2-(acryloyloxy) ethyl succinate, and 2-(2-vinyloxyethoxy) ethyl acrylate.

12. A method of manufacturing a Printed Circuit Board (PCB) including an inkjet printing step wherein a radiation curable composition as defined in claim 1 is jetted and cured on a substrate.

13. The method of claim 12, wherein curing is carried out using LED UV radiation.

14. The method of claim 12, wherein the inkjet printing step includes solder mask printing.

15. The method of claim 12, further comprising a heating step.

16. The method of claim 12, wherein the substrate is a dielectric substrate provided with an electrically conductive circuitry.

17. The method of claim 16, wherein the dielectric substrate is a polyimide based substrate.

* * * * *